No. 615,163. Patented Nov. 29, 1898.
G. W. GRIFFIN.
MACHINE FOR CUTTING OFF METAL.
(Application filed Aug. 6, 1898.)
(No Model.) 2 Sheets—Sheet 1.
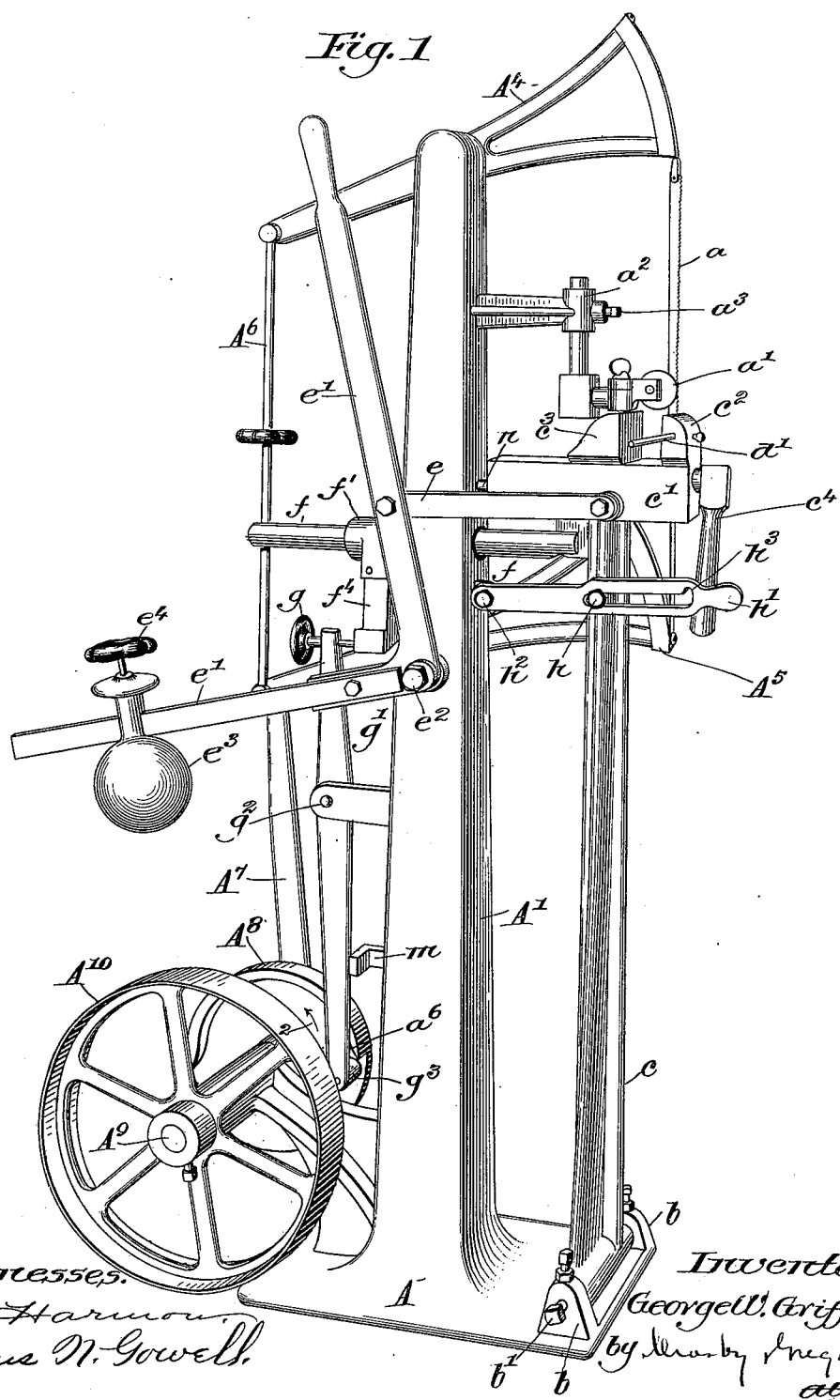

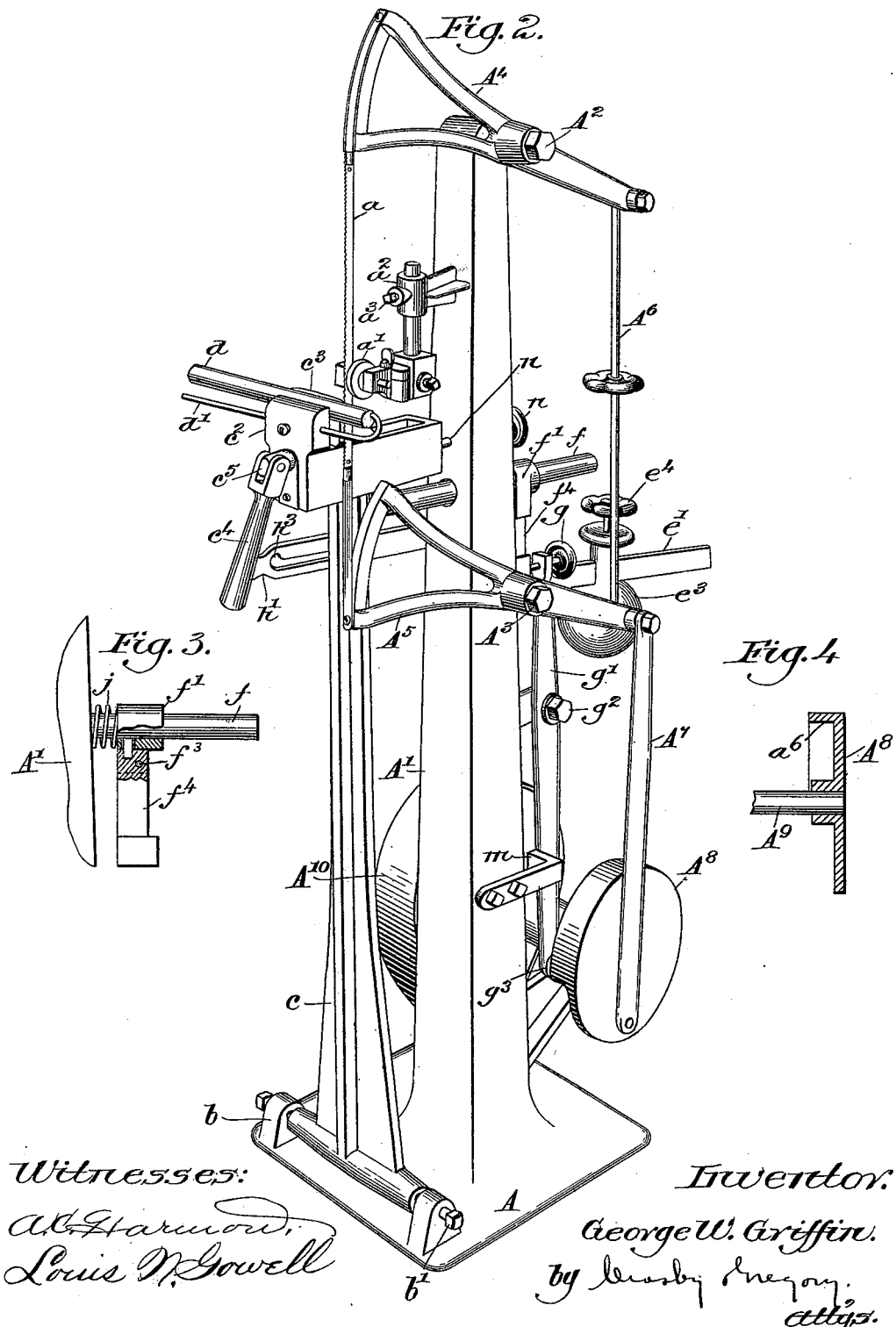

UNITED STATES PATENT OFFICE.

GEORGE W. GRIFFIN, OF FRANKLIN, NEW HAMPSHIRE, ASSIGNOR OF ONE-HALF TO PARKER C. HANCOCK, OF SAME PLACE.

MACHINE FOR CUTTING OFF METAL.

SPECIFICATION forming part of Letters Patent No. 615,163, dated November 29, 1898.

Application filed August 6, 1898. Serial No. 687,910. (No model.)

*To all whom it may concern:*

Be it known that I, GEORGE W. GRIFFIN, of Franklin, county of Merrimac, State of New Hampshire, have invented an Improvement in Machines for Cutting Off Metal, of which the following description, in connection with the accompanying drawings, is a specification, like letters on the drawings representing like parts.

This invention has for its object the production of a novel machine by which to cut off metal. The machine to be herein described contains a saw which acts against the metal or rod to be cut transversely, said metal or rod, called hereinafter the "work," being carried by a suitable work-holder which while the saw is making its active stroke to cut the work is borne against the teeth of the saw by a force due to the gravity of a weight, said weight being adjustable to thereby increase or lessen, as may be desired, the force by which the work shall be held against the saw, and consequently the speed at which the said saw may cut into the work at each active stroke this pressure varying according to the hardness of the work being cut. As the saw is moving in its inactive stroke after each active stroke the work-holder is moved in a direction to remove the bottom of the cut being made from contact with the teeth of the saw, so that said teeth are not at the inactive stroke of the saw subjected to any wear. This provision adds very materially to the life and effectiveness of the saw. It will be obvious that the cut being made is increased in depth at each active stroke of the saw, and as it is necessary only to just remove the bottom of the cut from the teeth of the saw in its inactive stroke I have devised means whereby the work-holder, while free to move toward and to contact with the saw in its active stroke, is always moved away from the saw for a certain uniform defined distance just as the saw starts in its inactive stroke, this movement being always of the same extent no matter how deep the cut in the work. This is effected, as herein shown, by the employment of a clutch which engages a rod extended from the work-holder, said clutch being made to engage said rod just as the inactive stroke of the saw is to be made, the clutch in its movement pushing the work-holder and the work carried by it away from the saw. The extent of the throw of the work-holder under the action of the clutch to remove the work from contact with the teeth of the saw at each inactive stroke may, however, be more or less, as desired, as the extent of said movement is under the control of an adjusting device shown as a screw.

Figure 1 is a left-hand side elevation of a cutting-off machine embodying this invention. Fig. 2 is a perspective looking at the same in the direction of its right-hand side and front. Fig. 3 is an enlarged detail showing part of the rod extended from the work-holder and the clutch for moving it and part of the column, and Fig. 4 shows the cam $A^8$ in section.

The framework of the machine consists, essentially, of a foot A, having a column $A'$, having suitable studs, as $A^2$ $A^3$, upon which are mounted saw-carrying arms or levers $A^4$ $A^5$, said levers being connected together by a suitable straining-rod $A^6$, one of the levers having attached to it a link $A^7$, actuated from a suitable crank-pin on a crank or disk $A^8$, carried by a shaft $A^9$, having applied to it a suitable belt or driving pulley $A^{10}$.

The levers $A^4$ and $A^5$ have connected with them a saw $a$, which runs in a suitable guide $a'$, the guide being adjustably mounted in a stand or bracket $a^2$ by means of a set-screw $a^3$.

The devices so far described are and may be of any usual or suitable construction, so they need not be herein further described.

The foot A has suitable ears $b$, which receive a rod $b'$, on which is mounted the foot $c$ of the work-holder $c'$, said work-holder having as a coöperating part of it a suitable vise, one jaw $c^3$ of which is or may be adjusted toward and from the other or fixed jaw $c^2$ by means of a suitable hand-lever $c^4$, fixed on one end of a screw $c^5$. The particular construction or shape of this vise is immaterial, and any suitable jaws for holding a rod or bar of metal, as $d$, may be used instead, and either of the jaws may be movable and the other stationary, but preferably the inner jaw will be movable. The outer jaw is herein shown as provided with a gage $d'$, it being represented as a metallic rod inserted through the jaw and as having its end bent around to serve as a stop against which the end of the work being cut transversely may be pushed, so that the cut may be made at exactly the desired distance from the end of the work, so as to leave pieces of desired or uniform length.

The work-holder has jointed to it a link $e$, attached to a lever $e'$, herein shown as an elbow-lever mounted upon a stud $e^2$ of the column $A'$, and one arm of said lever is shown as having mounted upon it a weight $e^3$, said weight having a suitable adjusting or stud screw $e^4$, so that the said weight may be fixed at any desired distance from the fulcrum, that depending entirely upon the hardness of the work to be cut and the pressure desired between the work and the saw during its active stroke, and it will be understood that while the saw is making its active stroke the position of this weight controls and regulates the pressure between the work and the saw-teeth.

The work-holder has connected with it a rod $f$, which is extended through the column and thereafter is passed loosely through a clutch-box $f'$, which is located at the rear side of the column, a spring $j$, (see Fig. 3,) located between the end of said clutch-box and said column, acting normally to keep the clutch-box at a uniform distance from the column. This clutch-box has pivoted between depending ears thereof at $f^3$ a dog $f^4$, it forming the active member of the clutch, the upper end of said dog when the lower end thereof is acted upon by the screw $g$, carried by the lever $g'$, being made to bite firmly the lower end of the rod and cause the dog and clutch-box to operate as a clutch to grasp the rod and move it and the work-holder in a direction away from the toothed edge of the saw. The lever $g'$ is pivoted at $g^2$ and has a roller or other stud $g^3$ at its lower end, which is acted upon by a cam-surface $a^6$ at the interior of the disk $A^8$, said cam in its effective stroke moving the lower end of said lever $g'$ in the direction of the arrow 2 near it in Fig. 1. By adjusting the screw $g$ in the lever $g'$ the dog may be made to bite the rod $f$ sooner or later in the movement of the lever $g'$, so that the work-holder may be moved more or less, as may be desired; but in practice it is only necessary that the clutch engage the rod $f$ at the commencement of each inactive stroke of the saw and move it and the work-holder just far enough to remove the bottom of the cut, as it was last left by the previous active stroke of the saw out of contact with the teeth of the saw, and immediately as the saw again moves in its active stroke the clutch is open, leaving the weight $e^3$ free to instantly move the work-holder in a direction to place the bottom of the cut against the teeth of the saw, so that the cut may be deepened.

I have herein shown one form of clutch device; but it is obvious that this invention is not limited to the particular form of clutch shown, as instead I may employ any other usual or suitable clutch device which may be made to grasp instantly and move the rod and then to open and free said rod from its control.

To retain or lock the work-holder in position to receive work, I have provided the work-holder or portion thereof with a stud $h$, (see Fig. 1,) which enters the irregular cam-slot in a lever or locking device $h'$, pivoted on the column at $h^2$, and when the said work-holder is drawn over far enough to the right, viewing Fig. 1, to place the stud in line with the widened part $h^3$ of the said slot then the lever will drop, engaging the stud and retaining the work-holder in a position to enable new work to be put into it, and thereafter by lifting the lever $h'$ the weight immediately assumes control of the work-holder. The stop $m$, fixed to the column, limits the movement of the lower end of the lever $g'$ toward the column. The column is provided with a suitable stop to determine the ultimate length of movement of the work-holder toward the column, and the stop is made adjustable. This stop is herein shown as a set-screw $n$, the inner end of which is extended through the column more or less, as shown in Fig. 1, so that the inner end of the work-holder meets it wherever it may be left, said work-holder contacting with the stop immediately after the work has been completely cut off.

Having described my invention, what I claim as new, and desire to secure by Letters Patent, is—

1. In a cutting-off machine for metal, the following instrumentalities, viz: a saw, means to reciprocate it, a work-holder, means to normally hold said work-holder and the work therein against the teeth of the saw by or due to the force of a weight, and means at each inactive stroke of the saw to temporarily move the work-holder in a direction to remove the bottom of the cut made in the work at the previous active stroke of the saw out of contact with the teeth of the saw, substantially as described.

2. In a cutting-off machine for metal, the following instrumentalities, viz: a saw, means to reciprocate it, a work-holder, means to normally hold said work-holder and the work therein against the teeth of the saw by or due to the force of a weight, and means to adjust said weight that it may exert greater or less force, and means at each inactive stroke of the saw to temporarily move the work-holder in a direction to remove the bottom of the cut made in the work at the previous active stroke of the saw out of contact with the teeth of the saw, substantially as described.

3. In a machine for cutting off metal, a saw, means to regulate it, a work-holder to hold the work to be cut, means to retain the work with a uniform pressure against the teeth of the saw in its active stroke, combined with a clutch, means to close it upon an extension of the work-holder, and move said work-holder and work away from the saw-teeth during its inactive stroke, substantially as described.

4. In a machine for cutting off metal, a saw, means to regulate it, a work-holder to hold the work to be cut, means to retain the work with a uniform pressure against the teeth of the saw in its active stroke, combined with a clutch, means to close it upon an extension of the work-holder, and move said work-holder and work away from the saw-teeth during its inactive stroke, and a locking device to retain the work-holder in position to receive new work, substantially as described.

In testimony whereof I have signed my name to this specification in the presence of two subscribing witnesses.

GEORGE W. GRIFFIN.

Witnesses:
J. R. SARGENT,
ALEXIS PROCTOR.